United States Patent
Bradley et al.

(10) Patent No.: US 6,466,328 B1
(45) Date of Patent: Oct. 15, 2002

(54) SYSTEM AND METHOD FOR REMOTE PRINTING IN A DISTRIBUTED NETWORK ENVIRONMENT

(75) Inventors: Thomas G. Bradley, Dayton, OH (US); Steve W. Stine, Beavercreek, OH (US); Myrle H. Bailey, Centerville, OH (US)

(73) Assignee: NCR Corporation, Dayton, OH (US)

( * ) Notice: Subject to any disclaimer, the term of this patent is extended or adjusted under 35 U.S.C. 154(b) by 898 days.

(21) Appl. No.: 08/778,639

(22) Filed: Jan. 3, 1997

(51) Int. Cl.[7] .............................................. G06F 15/00
(52) U.S. Cl. ........................................................ 358/1.15
(58) Field of Search ................................. 395/114, 112, 395/113, 115, 116, 117, 101, 110, 200.31, 200.33, 200.35, 200.47, 200.48, 200.49, 200.53, 200.56, 200.59, 508, 511, 858, 856, 821, 200.77; 358/407, 404, 444, 468; 345/508, 511

(56) References Cited

U.S. PATENT DOCUMENTS

| | | | |
|---|---|---|---|
| 3,609,666 A | | 9/1971 | Kamm et al. ............. 340/172.5 |
| 4,125,874 A | | 11/1978 | Higashide et al. .......... 364/900 |
| 4,641,263 A | | 2/1987 | Perlman et al. .............. 364/900 |
| 4,713,780 A | | 12/1987 | Schultz et al. ............... 364/514 |
| 4,754,428 A | * | 6/1988 | Schultz et al. ......... 395/200.77 |
| 4,829,421 A | | 5/1989 | Ritchie ......................... 364/200 |
| 5,088,051 A | | 2/1992 | Forsythe et al. ............. 395/117 |
| 5,109,486 A | | 4/1992 | Seymour ..................... 395/200 |
| 5,173,594 A | | 12/1992 | McClure ....................... 235/380 |
| 5,179,637 A | * | 1/1993 | Nardozzi ..................... 395/114 |
| 5,220,674 A | * | 6/1993 | Morgan et al. .............. 395/110 |
| 5,287,194 A | * | 2/1994 | Lobiondo .................... 395/114 |
| 5,371,888 A | | 12/1994 | Lehnertz et al. ............ 395/650 |
| 5,438,528 A | | 8/1995 | Emerson et al. ............ 364/580 |
| 5,463,772 A | | 10/1995 | Thompson et al. ......... 395/600 |
| 5,559,933 A | * | 9/1996 | Boswell ....................... 395/114 |

* cited by examiner

Primary Examiner—Gabriel Garcia
(74) Attorney, Agent, or Firm—Maginot, Moore & Bowman LLP (57) ABSTRACT

A method of the present invention includes receiving a print request from a computer application running at a first computer. After which, all pertinent print information needed to complete the print request is obtained from the computer application by engaging the computer application with a print process controller at the first computer. Another step creates a spool file for the print request at the first computer. The spool file is then transferred by a file transfer manager from the first computer to a second computer. The method includes storing the spool file at the second computer for processing as a print job at the second computer. Preferably, the transferring of the spool file from the first computer to the second computer occurs over a wide area network. This method may further include the step of releasing the computer application from engagement with the print process controller when the print process controller obtains all pertinent information to complete the print request. Another step that may be implemented with the present invention includes storing the spool file, as a first stored spool file, at the first computer before transferring the spool file to the second computer. Preferably, the method includes deleting the spool file from the first computer when the spool file is transferred from the first computer to the second computer.

17 Claims, 8 Drawing Sheets

FIG. 5  Spooler Control Table

| Source Information | | Destination Information | | |
| --- | --- | --- | --- | --- |
| Request System Name | Request Pseudo Printer Name | Remote Print Directory Path | Remote LAN NODE | Remote Printer Name or HOLD/hold |
| rcp002 | Laser1 | /cdunix/spool/ | CDirect3 | Laser1 |
| rcp002 | Laser2 | /appl/cdunix/spool/ | CDirect4 | Laser1 |
| rcp003 | Laser1 | /appl/cdunix/hold/ | CDirect4 | HOLD |
| rcp003 | Laser2 | /var/cdunix/spool/ | CDirect5 | Laser1 |

SYSTEM AND METHOD FOR REMOTE PRINTING IN A DISTRIBUTED NETWORK ENVIRONMENT

FIELD OF THE INVENTION

The present invention relates to a remote printing system and more particularly, relates to a remote printing system implemented in a client/server network.

BACKGROUND OF THE INVENTION

Many companies have expanded their operations to include various geographically dispersed offices (remote sites) throughout various countries of the world. As a result of the expansion of companies to geographically dispersed environments, companies had to make the resources of the company available to each remote site. Often in making resources available to the remote sites some resources were duplicated. Such resources that were commonly duplicated include computer software and hardware, instruction manuals and the like. Due to increased competition in many business areas, companies searched for ways to reduce costs. Many companies have reduced cost associated with computing by adopting client/server networks to aid in the transfer of information between remotes sites.

By using client/server networks, companies consolidated many of their computer programs, databases or needs in a central or regional computing center. With a central or regional computer processing center containing most if not all the computer programs and databases of the company, the remote sites routinely access the regional computing center via the computer network to use the company's computer resources. While it is relatively convenient for a remote site to access a computer program at a company's regional computing center for processing data, the conventional methods of printing a document have not been as convenient for a remote site. For example, when a computer system at a remote business site requests that a document be printed at the regional computing center, the document is faxed or sent by mail from the regional computing center to the remote site. This delay or cost in obtaining a printed copy of a document is not desirable for many business needs. Another conventional method for printing documents in a wide area network includes providing a print server and printer at the remote site. With a conventional remote print server and printer set-up, when the remote site initiates a print request to the application program at the regional computing center, the application program at the regional computing center communicates with the remote print server to schedule each print job.

While using the conventional remote print server and printer set-up is helpful, it does not satisfy many print needs in a wide area network environment because in a wide area network, communication over the wide area network can often be slow and a printing problem occurring a remote printer can farther slow completion of print processing. For example, if a remote site requests a print job from the computer application at the regional computing center and the printer assigned for printing is not operating properly at the remote site, the print request must be regenerated again when the problem is solved over the wide area network. Given the communication time required when operating with wide area networks, many of the above scenarios of generating a print request or occupying the processing time of the computer application are not acceptable for many companies. Additionally, if a user or users initiate simultaneous print requests to the same remote site, the printing process conventionally takes a long time to process because print jobs are printed successively over the wide area network to the remote site. Also, when printing over a wide area network some pages or lines of the document may be lost in the transmission with no way to recover the lost information without making another print request over the network.

Thus, there is a need in the art for a remote printing system that reduces or eliminates delays associated with printing documents at remote sites. Also, there is a need in the art to provide a remote printing system that eliminates or reduces the delays associated with remote printing when multiple print jobs are requested simultaneously. Additionally, there is a need in the art to provide a network printing system that ensures the integrity of the data of a print job that is sent over the network.

SUMMARY OF THE INVENTION

Generally described, the present invention provides a method of processing a print job in a client/server network that enables a computer application at a server to respond to a print request and to resume processing without being further responsible for printing operations that involve the requested print job.

More particularly, the present invention provides a method of processing a print job that includes receiving a print request from a computer application running at a first computer. After which, all pertinent print information needed to complete the print job associated with the print request is obtained from the computer application by engaging the computer application with a print process controller at the first computer. Another step creates a spool file for the print job at the first computer. The spool file is then transferred by a file transfer manager from the first computer to a second computer. The method includes storing the spool file at the second computer for processing as a print job at the second computer.

Preferably, the transferring of the spool file from the first computer to the second computer occurs over a wide area network. This method may further include the step of releasing the computer application from engagement with the print process controller when the print process controller obtains all pertinent information to complete the print job. Another step may include storing the spool file, as a first stored spool file, at the first computer before transferring the spool file to the second computer.

Preferably, the method includes deleting the spool file from the first computer when the spool file is transferred from the first computer to the second computer.

Preferably, the method also includes the step of storing the spool file at the second computer as a second stored spool file. The print job may be printed at a printer or displayed on a computer monitor connected to the second computer. Additionally, if a plurality of print requests are received simultaneously at the first computer for output at the second computer, the simultaneous print jobs corresponding to the print requests are concurrently transferred to the second computer system.

The present invention also includes a computer-readable medium on which is stored program modules for processing a print job. The program modules include instructions which, when executed by the computer system, perform several steps. One step includes receiving a print request from a computer application running at a first computer. A second step includes obtaining all pertinent print information to complete the print request from the computer application by engaging the computer application with a print process controller at the first computer. A third step includes creating a spool file for the print job corresponding to the print request at the first computer. A fourth step includes transferring the spool file, with a file transfer manager, from the first computer to a second computer. A fifth step includes storing the spool file at the second computer for processing as a print job at the second computer.

The computer-readable medium may include instructions which, when executed by the computer system, perform the step of releasing the computer application from engagement with the print process controller when the print process controller obtains all pertinent information to complete the print request.

Also, the computer-readable medium may include instructions which, when executed by the computer system, perform the step of transferring a plurality of simultaneous print jobs concurrently to the second computer system.

The present invention also includes a system for remote printing over a computer network. The remote printing system includes a first computer server connected to the computer network. The first computer server has a memory unit for storing various program modules. A shared computer application is stored in the memory unit. Also stored in the memory unit is an interceptor program module that is operative to intercept a print command received at the computer application. The interceptor program module is operative to engage the computer application to obtain print data associated with the print request and to create a spool file. Another program module stored in the memory unit is a print spooler program that is operative to schedule a spool file transfer to another computer system. A file transfer manager is also stored in the memory unit and is operative to transfer the spool file to said another computer system.

A remote computer system is also connected to the computer network. The remote computer system is operative to access and execute the shared computer application at the first computer server via the computer network. The remote computer system also is operative to initiate a print command in the shared computer application at the first computer server. The remote computer system receives from the file transfer manager via the network a print job requested from the remote computer system.

Thus, it is an object of the present invention to provide a remote printing system that reduces or eliminates delays associated with printing documents at remote sites.

This and other objects, features, and advantages of the present invention will become apparent from reading the following description in conjunction with the accompanying drawings.

DETAILED DESCRIPTION

Figure 1:
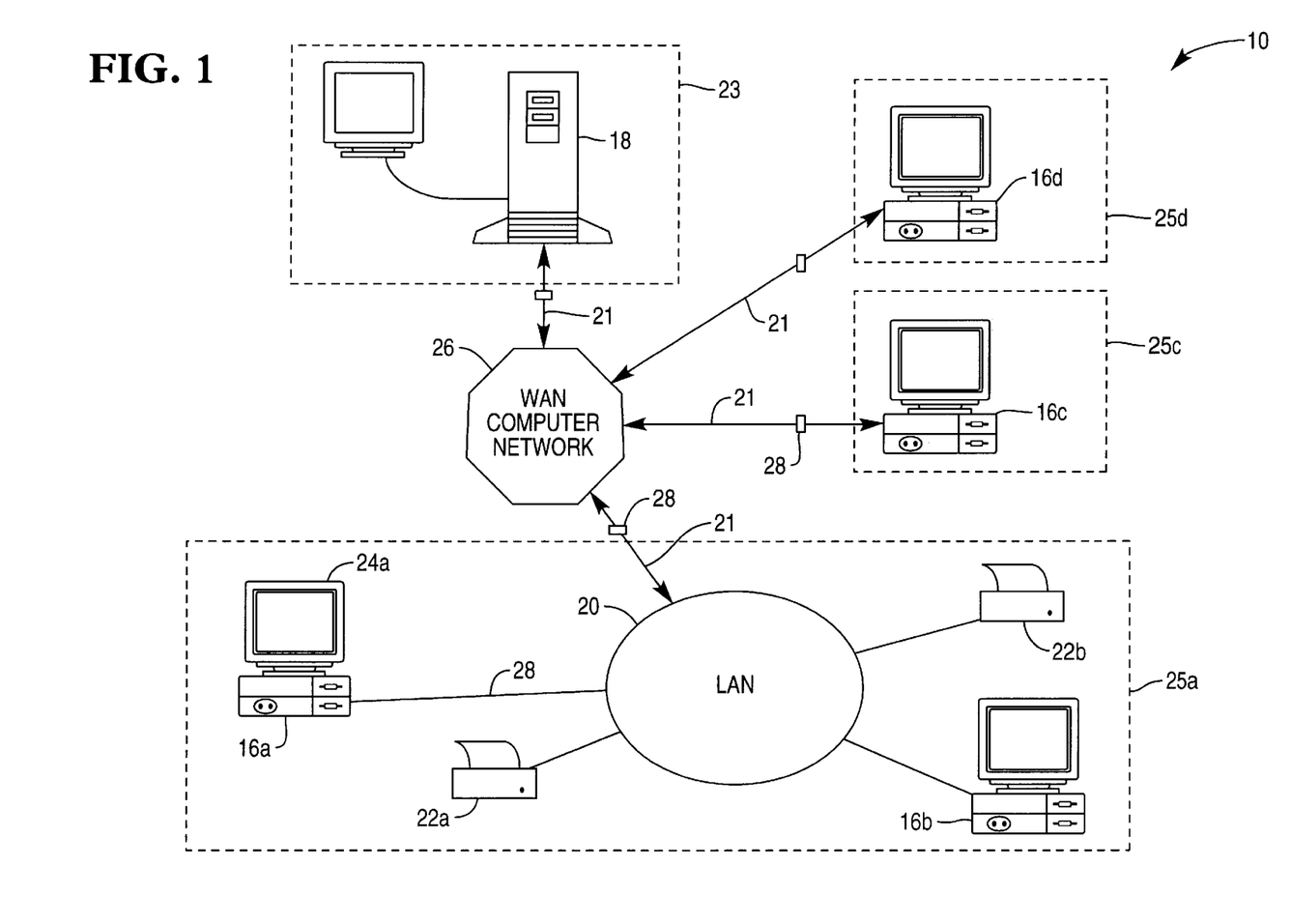
FIG. 1 is a diagram of a remote printing system operating according to the present invention.

Referring now to the drawings, in which like numerals illustrate like elements throughout the several views, FIG. 1 illustrates the basic components of a remote printing system 10 used in connection with the preferred embodiment of the present invention. The remote printing system 10 of the present invention operates within a computer network environment. The remote printing system 10 includes computer systems 16a,16b,16c,and 16d. An application server 18 contains computer applications that are used by the computer systems 16 for data processing and other processes. The computer systems 16 share centralized computer programs stored at the application server 18. The computer systems 16 access the computer programs over a wide area network (WAN) 26. The computer systems and application server 18 may be connected to the computer network 26 directly or via a local area network (LAN) 20.

An LAN is a group of computers and other devices dispersed over a relatively limited area and connected by a communications link that enables any devices to interact with other devices on the network. LANS often include microcomputers and shared resources such as printers and hard disks. Many LANS can support a wide variety of computers and other devices. The devices connected to the LAN must use the proper physical and data-link protocols for the particular LAN, and all devices that communicate with each other generally use the same communications protocol. Also, printers 22a and 22b are connected to the LAN 20. The computer system 16a connected to the LAN 20 may function as a computer server for the devices connected to the LAN 20. A server is a computer that runs administrative software for a computer network and controls access to part or all of the network and its devices.

The computer system 16a connected to the LAN 20 has a display monitor 24a. The display monitor 24a provides a visual interface for a user with the computer system 16a. Each computer system described herein has a respective monitor 24 connected thereto. The computer system 16a is connected to the WAN 26 by communication link 21. The WAN is a communications network that connects geographically separated devices. The application server 18 is connected to the WAN 26 by communication link 21. A display monitor 24 is also connected to the application server 18.

As generally discussed above, in an effort to reduce costs, some companies have centralized their primary computer applications and databases at a single or primary computing center. These primary computing centers are accessed by computers at remote sites to run and utilize the computer applications. For example, the computer system 16a, computer system 16b, printer 22a, and printer 22b are each located at remote business site 25a. The computer systems 16c and 16d are each located at remote business sites 25c and 25d, respectively while the application server 18 is located at a central or regional site 23. In the computer network system of FIG. 1, the application server 18 contains most if not all computer applications utilized by the computer systems 16. The computer applications at the application server 18 may include, for example, data warehousing programs, word processing programs, spread sheet programs, graphics programs, or forecasting programs. Thus, when a user at one of the remote computer systems 16 desires to process or use information from a shared application at the application server 18, the computer system 16 communicates over the WAN 26 to the application server 18. Control signals and data are transmitted along communication lines and over the WAN as necessary. The computer systems 16 and application server 18 may be generally referred to as a distributed client/server environment or network.

In conventional computer systems that operate in a distributed client/server environment, when a client computer is processing data using a shared application at an application server and a print command is initiated, the application at the application server controls the print process at the desired remote location. Consequently, if there is a printing problem at the remote location when a print request is made, the computer application at the application server 18 stays engaged with the printing process or is re-engaged when the printing problem is solved. Waiting for a printing problem at a remote location to be resolved slows or delays processing at the application server which consequently can hinder other computer systems using the shared applications at the application server. Additionally, in conventional printing in a distributed client/server network, when simultaneous print requests are made for printing at a single location, each print job is processed or sent sequentially from the application server to the remote computer system. Thus, handling simultaneous print request in a distributed client/server network can be time consuming.

Advantageously, the present invention provides a system and method that enables a user at a remote computer system 16a to initiate a print command for the remote location without occupying the computer application at the application server if there happens to be a printing problem at the remote printer. Additionally, the present invention provides a system and method that enables the reprinting of a document in the distributed client/server environment without accessing the computer application at the application server 18. The system and method of the present invention are enabled to print remotely without unduly occupying the processing time of the application server 18 by providing a computer application module that acts as a print request interceptor and controller. The print request interceptor and controller intercepts a print command initiated by a remote computer system 16 and completely processes the data from the computer application at the application server 18. The print interceptor and controller then sends a print job complete signal to the computer application. Thus, the computer application at the application server may be free to continue its normal operation for remote users without being responsible for controlling or overseeing the print process to completion.

The print request interceptor and controller processes the print data and creates a spool file for the print request and creates a control file that contains information specifying the destination of the print job. The print request interceptor and controller then notifies a print spooler so that the print spooler may schedule a file transfer of the data with a file transfer manager. The control file and print file are then transferred from the application server 18 by the file transfer manager over the WAN 26 to a remote server where the print job is to be printed. A spool file and print driver at a remote server handles or performs any operations for the computer system for the initiated print command. By processing all of the pertinent print information at the print request interceptor and controller then storing the information for file transfer to a remote server, the application and processing time required at the application server 18 is reduced. Because all of the print data is transferred and stored at the remote server, reprints of the print data may be obtained at the remote location without accessing or requiring the computer application at the application server to complete the print job. Also, by storing the processed print data at the remote location 16, if printing problems occur at a printer at the remote location, the processing time or computer application at the application server 18 does not have to be accessed when the print problem is resolved. Additionally, by using a file transfer manager to transfer a print job to a remote server, the file transfer manager may perform data compression, parity checking and other verification processes to ensure that the data transmitted is complete before deleting the print job information at the application server 18.

THE PREFERRED OPERATING ENVIRONMENT

Before providing a detailed description of the systems and methods of the present invention, it is helpful to briefly describe the preferred operating environment, which includes a computer network. Referring to FIG. 1, the remote printing system 10 enables the transfer of data 28 via communication lines 21 from computer systems 16 and application server 18. The data 28 is generally in the form of a command message, control message, or data file (print job). Computers that have access to a computer network are generally referred to as being "set up" on the computer network. When a device has a connection to the network, the device communicates over the network using the appropriate network protocol.

Figure 2:
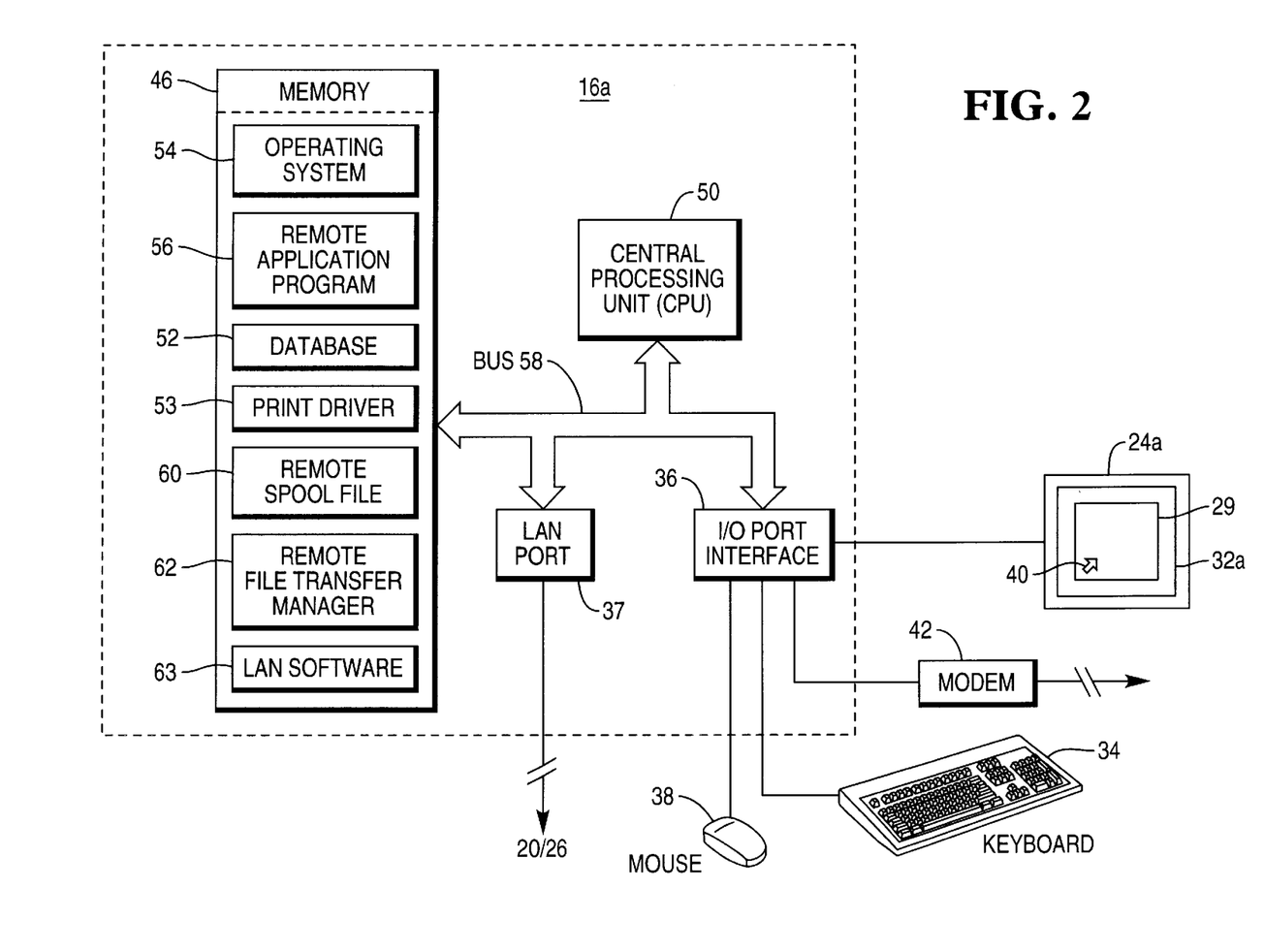
FIG. 2 is a diagram of a remote computer system used with the remote printing system of the present invention.

Referring to FIG. 2, a more detailed view of a computer system used with the present invention is shown. The computer system of FIG. 2 is described in connection with the computer system 16a. It should be appreciated that the details of computer system 16a is generally representative of each computer system 16. One aspect of the computer system 16a includes a graphical user interface system 29 operating in conjunction with the display screen 32a of the display monitor 24a. The graphical user interface system 29 is implemented in conjunction with the operating system to display and manage the information of computer applications and the operating system.

Although the present invention is described in conjunction with a conventional computer, it will be appreciated that the present invention may be utilized in other types of computer systems. The graphical user interface 29 is implemented as part of the computer system 16a to receive input signals from a conventional keyboard 34 via an input/output interface 36. Cursor keys on the keyboard 34, a mouse 38, trackball, or other pointing device may be used to move a cursor 40 on the display screen 32a for selection of various options.

A modem 42, connected to input/output interface 36, may serve as the means for communicating with the computer network 26. However, the computer system 16a is preferably connected to the computer network 26 via to a LAN port 37 via a router. For simplicity of the drawings, many components of a standard computer system have not been illustrated such as address buffers, memory buffers and other standard control circuits because these elements are well known and illustrated in the prior art and are not necessary for understanding of the present invention. A computer program used to implement the various steps of the present invention is generally located in a memory unit 46, and the processes of the present invention are carried out through the use of a central processing unit (CPU) 50. Those skilled in the art will appreciate that the memory unit 46 is representative of both read-only memory and random access memory. The memory unit also contains a database 52 that stores the data and tables used in conjunction with the present invention. A computer system suitable for use with the present invention may contain 16 MB of random access memory, a 240 MB hard drive and 486 microprocessor manufactured by INTEL Corporation of Santa Clara, Calif.

With continuing reference to FIG. 2, the CPU 50 is typically implemented as a single-chip microprocessor. The CPU 50, in combination with computer software, such as an operating system 54 and a remote application program 56, controls certain operations of the computer system 16a. The operating system 54, in conjunction with application programs, controls the allocation and usage of hardware and software resources such as memory, CPU time, disk space, printers and peripheral devices. It should be appreciated that window based operating systems exist such as various versions of Microsoft "WINDOWS", and UNIX operating system may be used with the present invention. The bus 58 of the computer system supports communications of control, address, and data signals between the CPU 50 and the remaining components of the computer system 16a. It should be appreciated that different types of buses are used in a computer system and that bus 58 generally represents the various types. The memory unit 46 and the CPU 50 are connected by the bus 58 which is designed to provide an electrical interface between computer system components. The processes implemented by the CPU 50 may be communicated as electrical signals along the bus 58 to an input/output device, such as display monitor 24a. The display monitor 24a provides a visual display of computer generated graphics originating from the processes implemented by the CPU 50.

The memory unit 46 also contains a database 52 used to store data for use with the computer system 16a. Additionally, the memory unit contains a print driver 53, a remote spool file 60, a remote file transfer manager 62 and LAN software 63. A print driver is a computer program that enables general application programs to work with a particular printer without the particular application knowing the specific details of the printer's hardware and internal computer language or protocol. The print driver 53 is adapted to operate specifically with a printer 22a or 22b. The remote file transfer manager 62 receives files transmitted over the WAN 26 such as a print job or spool file from the application server 18. The remote spool file 60 receives and stores the spool file that is processed and transmitted from the application server 18 for processing at the remote computer system 16a.

Figure 3:
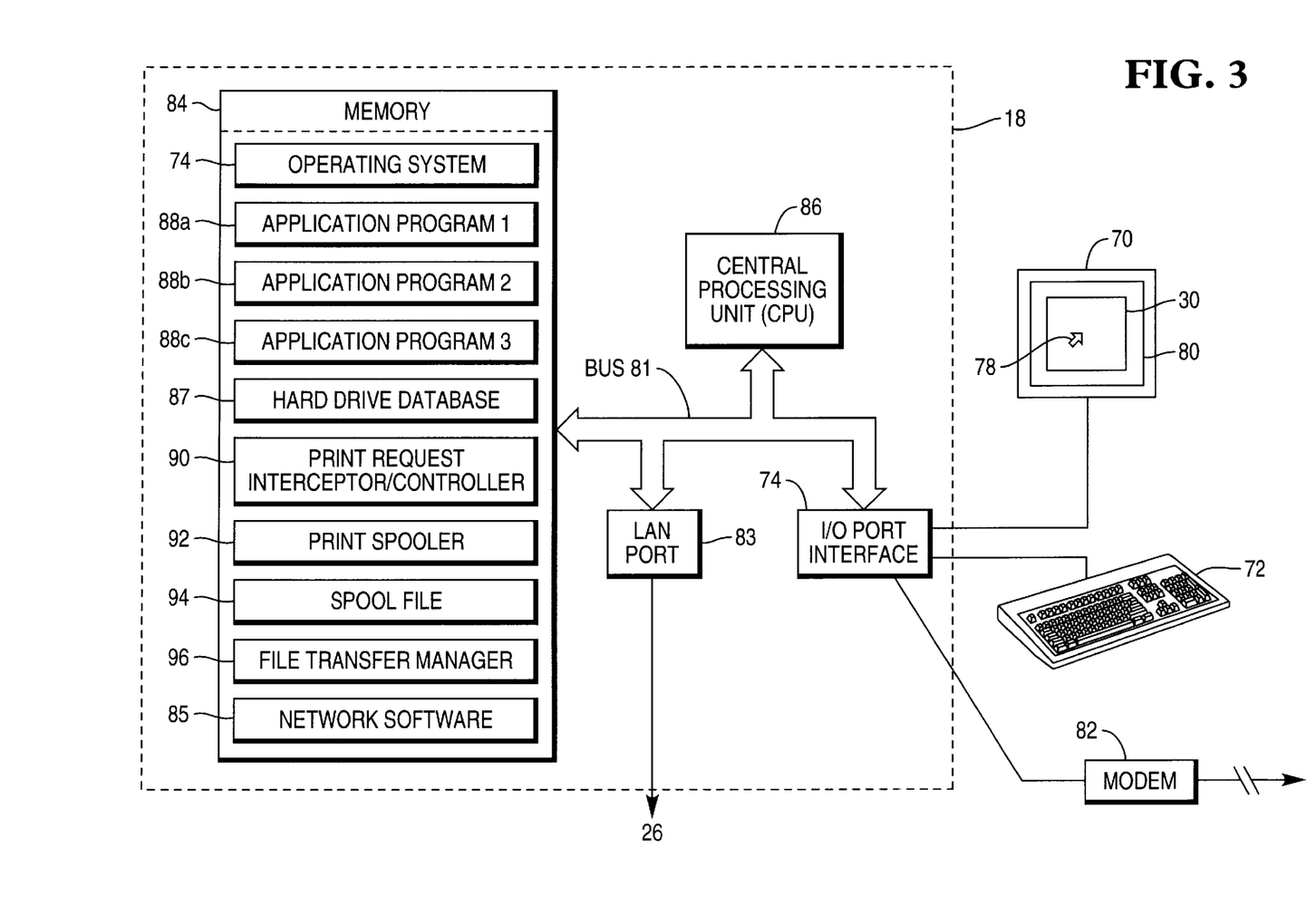
FIG. 3 is a diagram of an application server used with the remote printing system of the present invention.

Referring to FIG. 3, the application server 18 is shown in more detail. The components of the application server 18 are basic components of a computer system such as generally discussed in connection with FIG. 2. The application server 18 has a display screen 80 upon which a graphical user interface 30 is displayed. A user may interact with the graphical user interface 30 by using a cursor 78 controlled by the keyboard 72. The processes at the application server 18 are controlled by a central processing unit 86. Operations performed at the central processing unit are communicated to the peripheral devices of the computer system via a bus 81. Interactions with external devices are transmitted through the input/output port 74. The input/output port 74 enables connection to the keyboard 72 and a modem 82. The application server 18 is preferably connected to the network via a LAN connection through a LAN port 83.

The application server 18 functions as a server by running shared application programs and processing initial print requests. The application programs and databases reside in memory 84. The operating system 74 may be a UNIX-based server system, Microsoft Windows-based server system, or any suitable operating server system. The memory 84 may contain, for example, a plurality of application programs 88a, 88b and 88c. The application programs 88 process data and inputs from the remote computer systems 16. The server software 85 manages the processes for the networked computer systems 16. The hard drive/database 87 may be used to store data related to the specific assignment of remote computers to remote servers/printers used in the present invention.

Controlling and performing the remote printing processes of the present invention are a print request interceptor/controller 90, a print spooler 92, a spool file 94, a file transfer manager 96, in conjunction with the central processing unit 86. Although illustrated as individual units, the print request interceptor/controller 90, print spooler 92, print spool file 94 and file transfer manager 96 may be considered as a single unit which performs multiple processes. The print request interceptor/controller 90, print spooler 92, print spool file 94, and file transfer manager 96 collectively receive and process print requests and print jobs from the application programs 88a, 88b, and 88c in a manner that releases the application programs from the responsibility of overseeing a print job through completion at a remote printer or remote server. Generally, a print spooler is computer software that intercepts a print job that is to be delivered to a printer. The print spooler then sends the print job to a disk or memory instead, where the print job is held until the printer is ready to process the print data. However, with the present invention, the print job or spool file is stored temporarily at the application server until it is transferred over the WAN 26 by a file transfer manager.

In this detailed description, numerous details are provided such as computer display system elements, formats, sample data, etc., in order to provide an understanding of the invention. However, those skilled in the art will understand that the present invention may be practiced without the specific details.

Certain of the descriptions which follow are presented in terms of display images, processes, and symbolic representations of operations of data bits within the computer's memory. As will be known to those skilled in the programming arts, these process descriptions, messages, notification descriptions, and graphic displays are the means used by those skilled in the art of computer programming and computer construction to convey teachings to others skilled in the art.

For purposes of this discussion, a process or method is generally a sequence of computer-executed steps leading to a desired result. These steps require physical manipulations of physical quantities, such as electrical, magnetic, or optical signals that are capable of being stored, transferred, combined, compared, or otherwise manipulated. Furthermore, it should be understood that the programs, processes, objects, etc., described herein are not related or limited to any particular computer or apparatus. Rather, various types of machines may be used with programs constructed in accordance with the teachings herein.

OPERATION OF THE REMOTE PRINTING SYSTEM

Having described the basic components used in implementing the various aspects of the present invention, the operations and functions of the remote printing system 10 will be described in more detail in connection with the computer program modules used to facilitate operations of the present invention.

Figure 4:
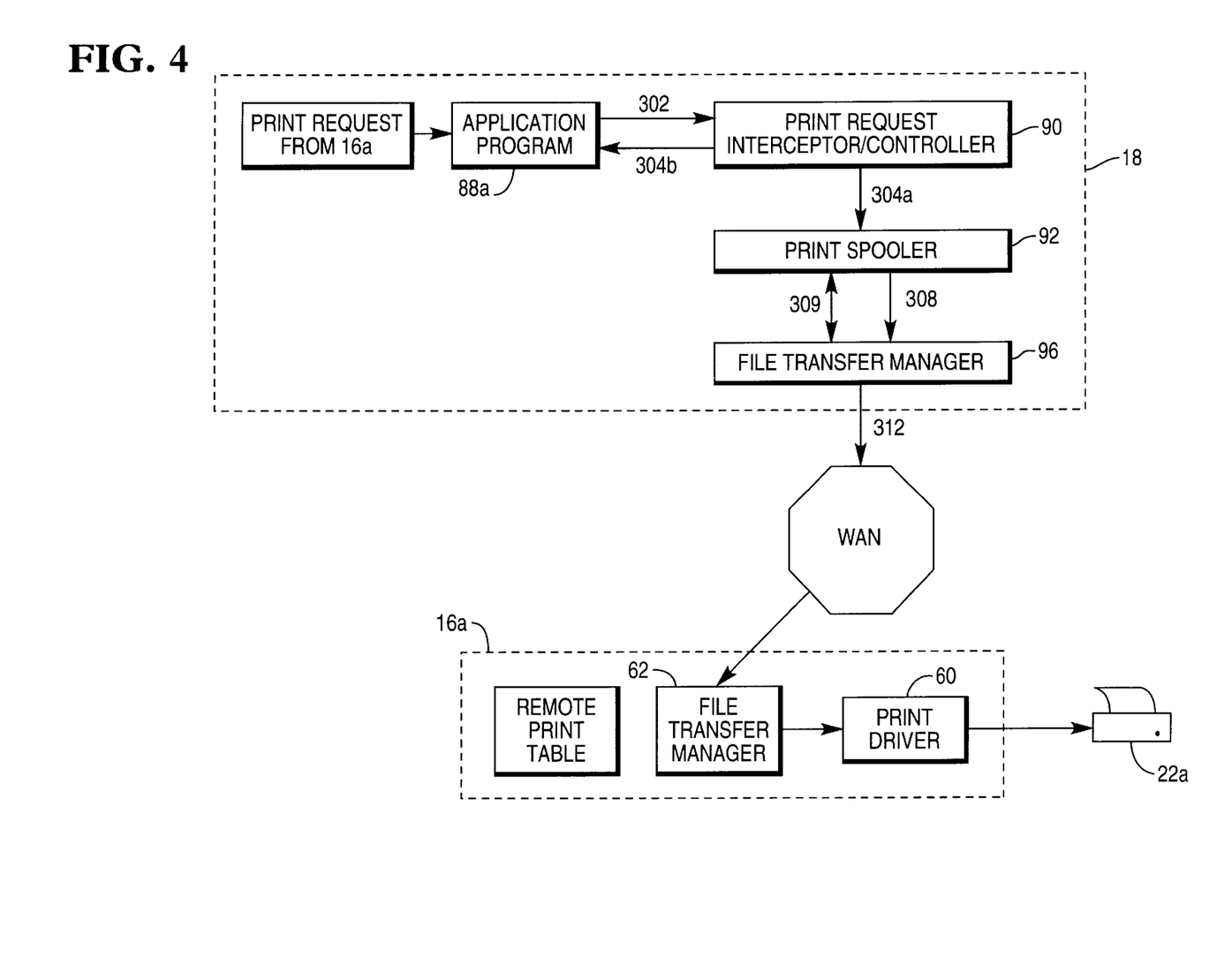
FIG. 4 is a diagram of the general operations that occur between various computer program modules used with the remote printing system of the present invention.

Referring to FIG. 4, the general flow, control and data processing occurring at or controlled by the various computer program modules at the application server 18 and the remote computer system 16 are discussed. The first step implemented by the processes of the present invention is the issuance of a print request by a user that is processed, for example, at the computer application 88a. Control then proceeds to the print request interceptor and controller 90 as indicated by arrow 302. At the print request interceptor and controller 90, the pertinent print information and data from the application is copied and stored to a spool file for backup and processing at the application server 18. The print request interceptor and controller 90 then notifies the print spooler 92 that a print job has been received and passes the pertinent information and data to the print spooler 92 as indicated by the arrow 304a. The arrow 304b represents a signal transmitted back to the computer application 88a indicating that the print job is complete. Therefore, the computer application 88a may proceed to handle other requests of a computer user operating at a computer system 16. The print request interceptor and controller 90 is a local printer driver interface that spools the local printer request onto the application system. In order for the computer application to "believe" (receive a signal indicating that printing is complete) that the print job is complete, the remote printer is set up as a "pseudo" printer (i.e., as if the remote printer were a locally configured printer on the application server). The "pseudo" printer for the remote printer is then "set-up, mapped or added to a spool table that indicates the appropriate directory or location designated for the "pseudo" printer. The print request interceptor and controller 90 creates two files: a spooler request file, and a spooler data file. The spooler request file contains the application system name, pseudo printer name, spool file name, user logon name, and application local printer options. The print request interceptor and controller 90 then notifies the spooler that the spool data is ready via a remote shell, as known to those skilled in the art, to the application server 18.

Figure 5:
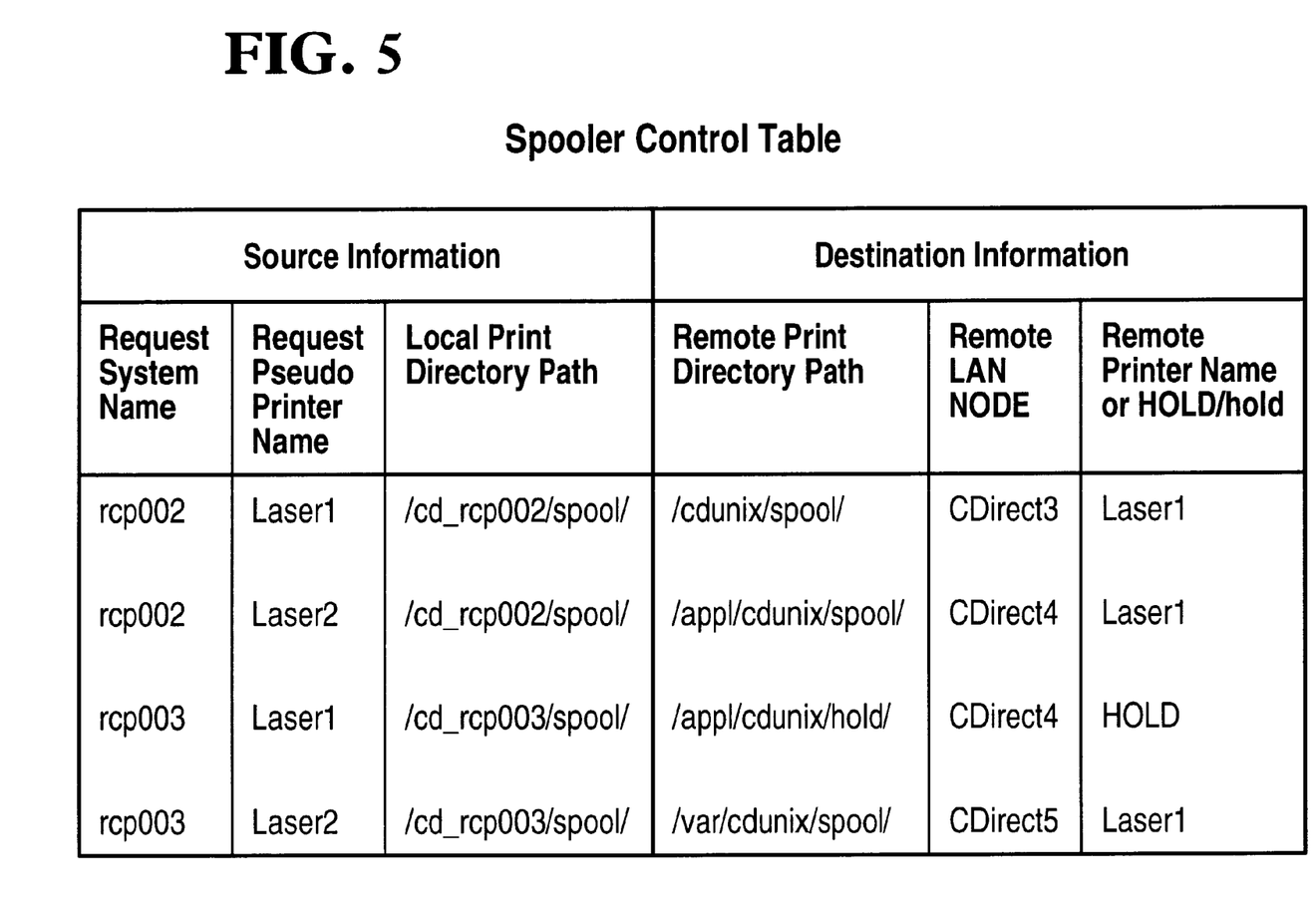
FIG. 5 is a diagram of an example spooler control table.

At the print spooler 92, the print spooler 92 is activated to resolve and schedule the print information received from the print request interceptor and controller 90. The print spooler maps a pseudo printer to a remote server/printer (i.e., determines the remote print server and physical printer that should process the completed print data). The print spooler 92 scans each spool directory for print requests. Using a control table for the print spooler 92 as illustrated, for example, in FIG. 5, each spooler script handles restart recovery, compresses data during transfer, creates a remote spool file and local printer request file, issues a print job or hold command and deletes files after successful transfer. The print spooler 92 then creates a request to either a local or shared file transfer manager 96, as indicated by the arrow 308. The print spooler continuously monitors the file transfer manager 96 to check the status of the transfer as indicated by arrow 309. If the print spooler 92 determines that the transfer was successful the print spooler 92 may delete the spool data stored at the application server 18. If the print spooler 92 determines that the transfer was unsuccessful, then the print spooler 92 reschedules the transfer request with the file transfer manager 96. The file transfer manager 96 performs the process of transferring the print data from the application server 18 to the computer system 16. The file transfer manager 96 may be any software that transfers data or a data file using a communication protocol between two systems. Commercially available file transfer managers that are useful with the present invention are CONNECT:Direct available from Sterling Commerce, Dallas, Tex. or any other commercially available file transfer manager suitable for performing the functions described herein. Some file transfer managers provide added functions and features that are desirable, such as encryption, compression, remote process or program activation and point of error recovery. Although many file transfer managers are compatible with the present invention, it can be more efficient to use file transfer manager that has compression and remote programmer process activation.

If the file transfer manager has remote program or process activation, a remote print request can be scheduled as part of the transfer request from the print spooler 92. If the file transfer manager 96 does not have remote program activation, a remote program at the computer system 16a is monitors the remote spool file at the computer system 16a for new print requests that appear. This remote program would then issue a final print command.

The file transfer manager 96 then transfers the print data or job to the file transfer manager 62 at the remote computer system 16a. The remote computer system 16a acts as the remote print server. The file transfer manager 62 transfers the spool data to the hard drive in a directory or remote spool file 60 specified for the data. The file transfer manager 62 may then activate a print request to the local printer 22a. The print request is then activated and responded to by the print driver 60 at the computer system 16a. Optionally, the file transfer manager 62 may not issue a print request, in which case the spool data is simply stored. Having transferred the entire spool file from the application server 18 to the remote computer system 16a, the remote spool file 60 now contains all information necessary to reprint any process print/spool request. A local spool script or graphical user interface can be provided to enhance the user's ability to search for and reprint reports/print requests. By changing an existing pseudo printer mapping or by defining special pseudo printer names, spool files can be sent to several remote locations or the remote printing can simply be delivered to the remote computer system 16a and stored for viewing by a user via a graphical user interface.

NETWORK CONFERENCING PROCESSING STEPS

Figure 6A:
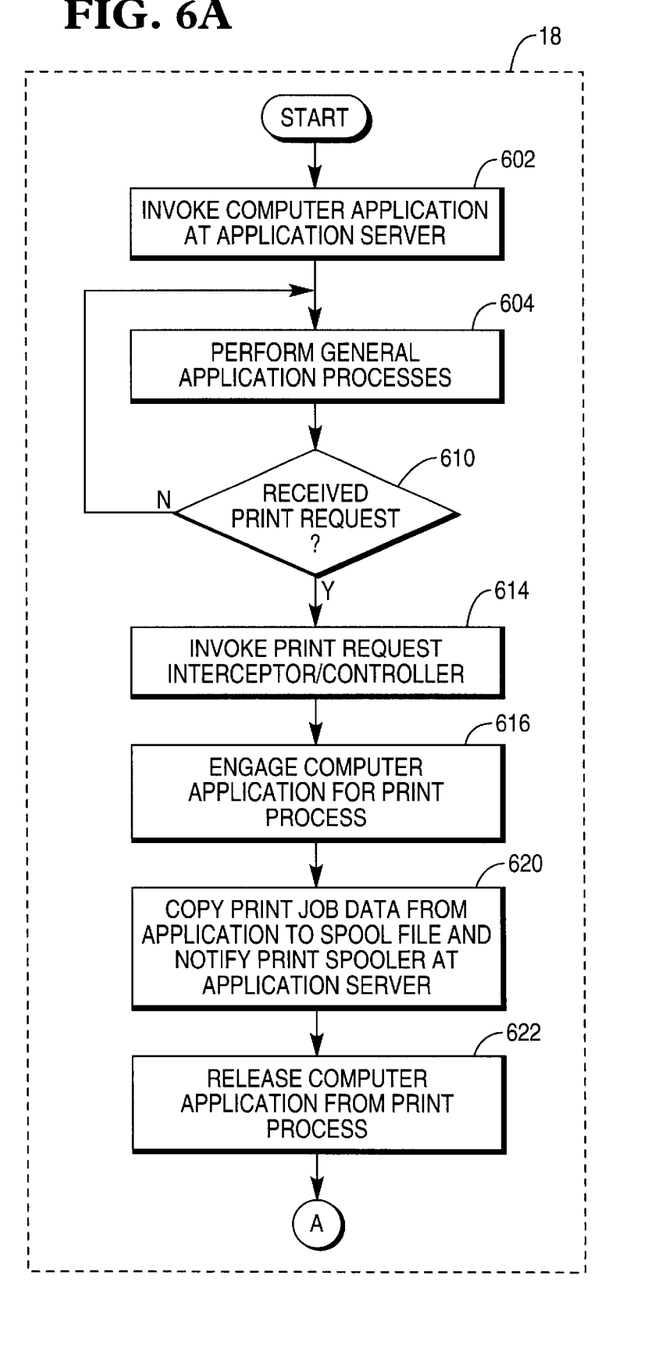
FIGS. 6a and 6b are flow diagrams of the processes implemented at the application server used in connection with the remote printing system of the present invention.
Figure 6B:
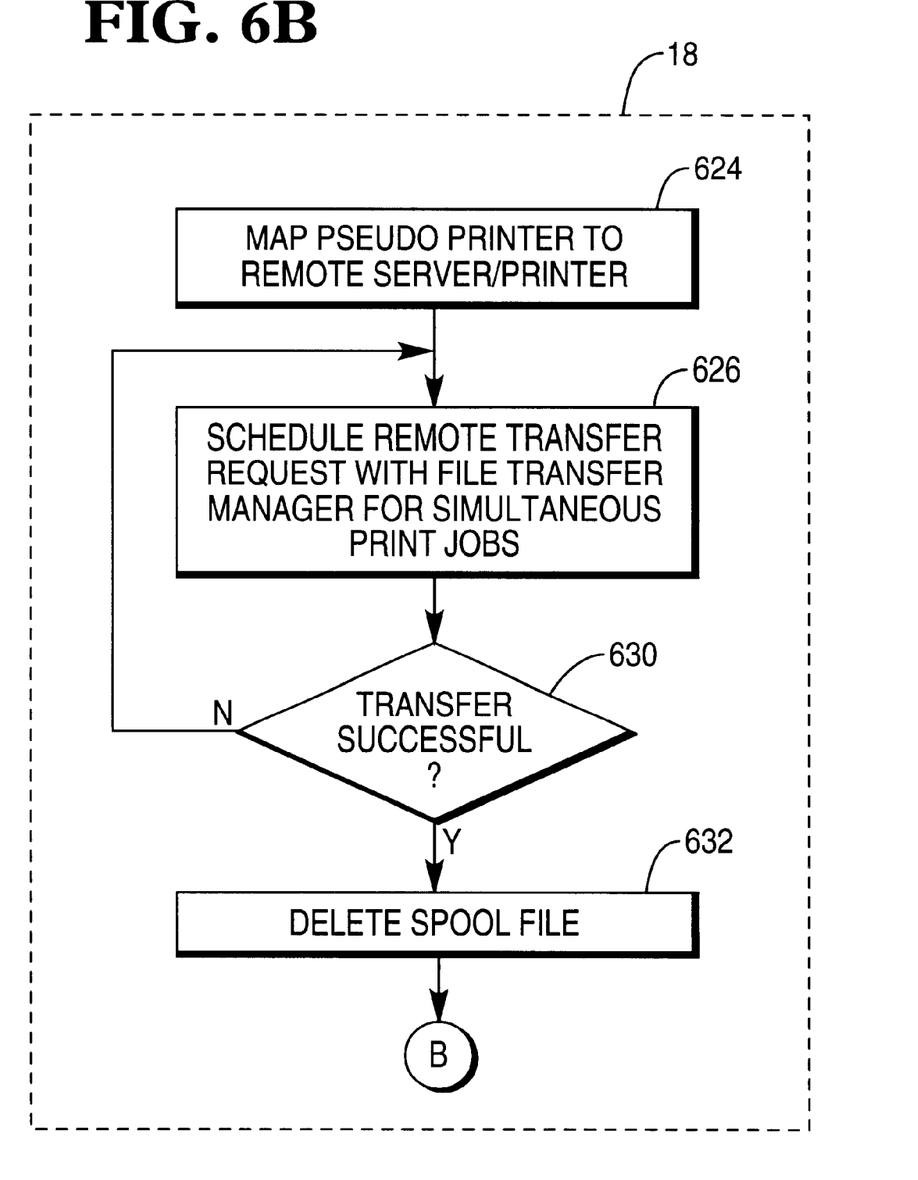
Figure 7:
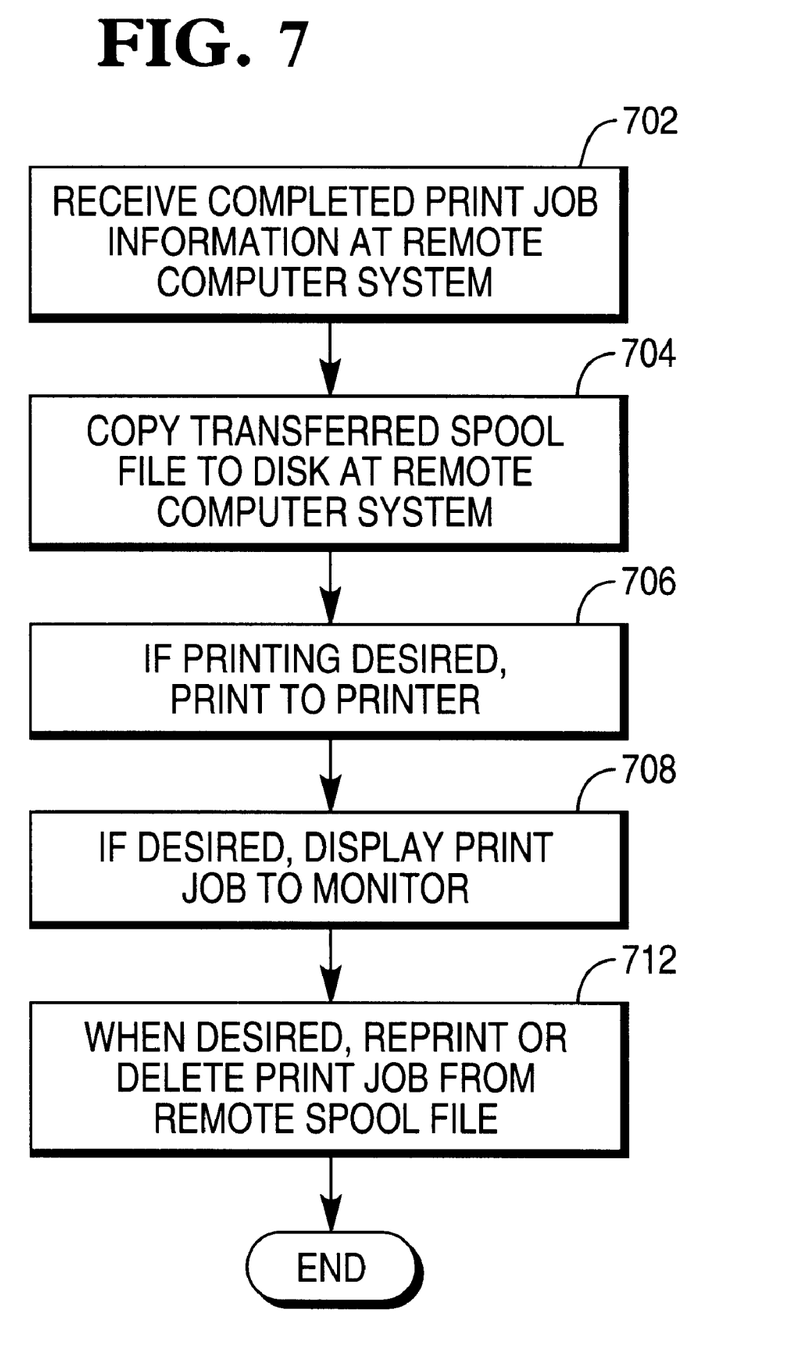
FIG. 7 is a flow diagram of the processes implemented at a remote computing site used in connection with the remote printing system of the present invention.

The preferred steps of the method for providing the remote printing system of the present invention is shown in flow diagram form in FIGS. 6A, 6B and 7. The steps of the preferred method are implemented with computer programs operating on the application server 18 and computer systems 16 over a network such as the distributed client/server network in FIG. 1. The preferred steps will be discussed in conjunction with FIGS. 1, 2 and 3.

Referring to FIGS. 6A, 6B, and 7, the processes performed at the application server 18 and the computer system 16a are described. At step 602, a computer application 88a is invoked at the application server 18. The computer application 88a performs processes in accordance with a user's input from a computer system 16a as shown as step 604. At step 610, the operating system 74 determines whether a print request has been received from a computer application 88a. If no print request has been received from the computer application 88a the process continues to operate as discussed in connection with step 604. If, however, at step 610, a print request is received from a computer application 88a, the process proceeds to step 614. At step 614, the operating system 74 invokes the print request interceptor/controller 90. At step 616, the print request interceptor/controller 90 engages the computer application 88a to receive the pertinent print information and data. The print request interceptor/controller 90 copies the print information and data to a spool file 94 and notifies the print spooler 92 that the print information and data is ready to be scheduled and processed by the print spooler 92. The process then proceeds to step 622 where the computer application 88a is released from engagement with the printing modules. The computer application 88a is then ready to perform other processes for the same user or other users.

Referring to FIG. 6B, the processes implemented at the application server 18 are further described. At step 624, the print spooler 92 maps the pseudo printer to the remote server/printer that is designated to receive the printing job from the particular remote computer 16. The process then proceeds to step 626. At step 626, the print spooler 92 schedules a remote file transfer request with the file transfer manager 96 for delivery or transfer to a designated remote server/printer. If multiple print requests are received simultaneously for the same remote site, the multiple print jobs are scheduled for transfer to the remote site as multiple simultaneous or concurrent transmissions. Simultaneous generally means the receipt of multiple print requests within a time period that is sufficiently long to enable the requests to be scheduled for concurrent transfer. At step 630, the print spooler 92 monitors the file transfer manager 96 to determine whether the print data was successfully transferred. If the print job or print data was not successfully transferred then the process proceeds to step 626 where the print spooler 92 reschedules the remote file transfer request. However, if at step 630 the print spooler 92 determines that the file transfer was successful, the process proceeds to step 632. At step 632, the print spooler 92 deletes the local spool file data related to the particular job in order to create memory space at the application server 18. Because all of the print job data was transferred to a remote system, the application server 18 is not required to be involved in the printing process at a remote location once an entire print job has been successfully delivered to the remote computer system 16.

Referring to FIG. 7, the processes implemented at the remote computer system 16a are described. At step 702, the remote computer system 16a receives the completed print job information from the application server 18. At step 704, the completed print job information is transferred to and stored at a spool file at the remote computer system 16a. The process then proceeds to step 706. At step 706 if a print request is received, the print job is printed at a remote printer 22. At step 708, the completed print job may be displayed at a computer monitor 24a. At step 712, the remote spool file may be accessed for reprints or deletions.

The foregoing relates to the preferred embodiment of the present invention, and many changes may be made therein without departing from the scope of the invention as defined by the following claims.

What is claimed is:

1. A method of processing a print job, comprising the steps of:
    receiving a print request from a computer application running at a first computer;
    obtaining all pertinent print information to complete said print request from said computer application by engaging said computer application with a print process controller at said first computer;
    creating a spool file for said print request at said first computer;
    transferring said spool file, with a file transfer manager, from said first computer to a second computer; and
    storing said spool file at said second computer for processing as a print job at said second computer.

2. The method of claim 1 further comprising releasing said computer application from engagement with said print process controller when said print process controller obtains all pertinent information to complete said print request.

3. The method of claim 2 further comprising storing said spool file, as a first stored spool file, at said first computer before transferring said spool file to said second computer.

4. The method of claim 3 further comprising the step of deleting said spool file from said first computer when said spool file is transferred from said first computer to said second computer.

5. The method of claim 4 further comprising the step of storing said spool file at said second computer as a second stored spool file.

6. The method of claim 5 further comprising the step of printing a print job stored in said second stored spool file.

7. The method of claim 6 further comprising the step of displaying said print job on a monitor connected to said second computer.

8. The method of claim 2 further comprising the step of receiving a plurality of simultaneous print requests at said first computer to be sent to said second computer, wherein said spool file is created with print job information from each of said plurality of print request and wherein each of said plurality of simultaneous print jobs are concurrently to said second computer system.

9. The method of claim 1 further comprising the step of verifying, with said file transfer manager, that said spool file is transferred without any loss of data.

10. The method of claim 4 further comprising the step of verifying, with said file transfer manager, that said spool file is transferred without any loss of data before said step of deleting.

11. The method of claim 1, wherein the transferring step includes the steps of (i) compressing the spool file to obtain a compressed spool file, and (ii) transferring the compressed spool file to the second computer.

12. A computer-readable medium on which is stored a program module for processing a print job, the program module comprising instructions which, when executed by said computer system, perform the steps of:
    receiving a print request from a computer application running at a first computer;
    obtaining all pertinent print information to complete said print request from said computer application by engaging said computer application with a print process controller at said first computer;
    creating a spool file for said print request at said first computer;
    transferring said spool file, with a file transfer manager, from said first computer to a second computer; and
    storing said spool file at said second computer for processing as a print job at said second computer.

13. The computer-readable medium of claim 12, wherein the program module further comprises instructions which, when executed by said computer system, perform the step of releasing said computer application from engagement with said print process controller when said print process controller obtains all pertinent information to complete said print request.

14. The computer-readable medium of claim 12, wherein the program module further comprises instructions which, when executed by said computer system, perform the step of receiving a plurality of simultaneous print request at said first computer to be sent to said second computer, wherein said spool file is created with print job information from each of said plurality of print request and wherein each of said plurality of simultaneous print jobs are transferred concurrently to said second computer system.

15. The computer-readable medium of claim 12, wherein said spool file transferring step that is performed by instructions of said program module which is executed by said computer system, includes the steps of:

compressing said spool file to obtain a compressed spool file, and transferring said compressed spool file to said second computer.

16. A remote printing system for operation over a computer network, comprising:

a first computer server connected to said computer network and said first computer server having memory unit for storing program modules;

a shared computer application stored in said memory unit;

an interceptor program module operative to intercept a print command initiated from said computer application and operative to engage said computer application to obtain print data associated with said print request and operative to create a spool file for the print request;

a print spooler program module stored in said memory unit operative to schedule a spool request for said print request;

a file transfer manager stored in said memory unit operative to transfer said spool file, as schedule by said print spooler, to another computer system; and a remote computer system connected to the computer network, said remote computer system operative to access and execute said computer program at said first computer server via said computer network, said remote computer system operative to initiate a print command in said computer program at said first computer server; and said remote computer system operative to receive from said file transfer manager via said network a print job requested from said remote computer system.

17. The remote printing system of claim 16, wherein said file transfer manager is further operative to compress said spool file prior to transferring said spool file to said another computer system.

* * * * *